US007162917B1

(12) United States Patent
Lopez

(10) Patent No.: US 7,162,917 B1

(45) Date of Patent: Jan. 16, 2007

(54) DEVICE FOR REMOVING EXCESS AIR PRESSURE FROM VEHICLE TIRE

(76) Inventor: Shaun D. Lopez, 2744 Fox Glenn Ct., Hurst, TX (US) 76054

(*) Notice: Subject to any disclaimer, the term of this patent is extended or adjusted under 35 U.S.C. 154(b) by 0 days.

(21) Appl. No.: 11/145,422

(22) Filed: Jun. 6, 2005

(51) Int. Cl.
*G01M 17/02* (2006.01)

(52) U.S. Cl. .......................................... 73/146; 142/415

(58) Field of Classification Search .................. 73/146; 142/415, 416, 417
See application file for complete search history.

(56) References Cited

U.S. PATENT DOCUMENTS

| | | | | |
|---|---|---|---|---|
| 3,696,668 A | | 10/1972 | Patrick | |
| 4,015,623 A | * | 4/1977 | Wanstreet | 137/224 |
| 4,054,163 A | | 10/1977 | Brown, Jr. et al. | |
| 4,269,312 A | | 5/1981 | Bressler | |
| 4,470,506 A | * | 9/1984 | Goodell et al. | 206/223 |
| 4,489,855 A | | 12/1984 | Boetger | |
| 4,678,017 A | * | 7/1987 | Schultz | 152/416 |
| 4,744,399 A | * | 5/1988 | Magnuson et al. | 152/417 |
| 4,763,516 A | | 8/1988 | Greenspan | |
| 4,782,878 A | * | 11/1988 | Mittal | 152/417 |
| 4,850,402 A | * | 7/1989 | Cunningham et al. | 141/38 |
| 4,998,438 A | | 3/1991 | Martin | |
| 6,826,508 B1 | | 11/2004 | Fujioka | |

* cited by examiner

*Primary Examiner*—Edward Lefkowitz
*Assistant Examiner*—Andre Allen
(74) *Attorney, Agent, or Firm*—Donald R. Schoonover

(57) ABSTRACT

A device for removing excess air pressure from a valve stem of a tire of a vehicle having a body with a cavity, an intake port for forming a fluid-tight seal with, extracting compressed air through the valve stem, located near the input end of the body, and conveying the air to the cavity; a control mechanism for selecting a desired magnitude of air pressure; a pressure-measuring mechanism for determining the magnitude of air pressure in the cavity; a display mechanism for displaying the selected magnitude of air pressure; and a release mechanism with a release valve and an exhaust port. The release mechanism has an opened configuration wherein the release valve allows compressed air from the cavity to freely escape through the exhaust port when the magnitude of air pressure in the cavity is greater than the selected magnitude of air pressure, and a closed configuration wherein the release valve prevents compressed air from the cavity from escaping through the exhaust port when the magnitude of air pressure in the cavity is less than the selected magnitude of air pressure.

16 Claims, 1 Drawing Sheet

10 15 53 75 35 27 23 63 25 93 17 73 57 85 83 67 87 33 37 47 65 45 13 43 77 55

DEVICE FOR REMOVING EXCESS AIR PRESSURE FROM VEHICLE TIRE

BACKGROUND OF THE INVENTION

1. Field of the Invention

The present invention relates to accessories for vehicles and, more specifically without limitation, to accessories for maintenance of vehicle tires.

2. Description of the Related Art

The automobile is a dynamic element of everyday life, used substantially throughout the world by numerous individuals. With the number of automobiles being manufactured annually, it is small wonder that there is such as interest in such products to ensure safe operation of all types of motor vehicles. Nowhere is this more evident than in the United States where the great love for the automobile in unparalleled anywhere else in the world. Over the past fifty years, legislative and law enforcement bodies at the local, regional, and national levels have focused on the enactment and enforcement of safety regulations and guidelines, as well as compliance with current laws to ensure the safety of occupants of the vehicles. Some of these laws are centered on activities of motorists themselves, while others have been directed at automobile manufacturers for the production of new vehicles.

Some of the safety guidelines provide for maintaining good tires and good tread on the tires. To maintain good tread on tires, it is imperative that proper inflation pressure be maintained in tires. Proper inflation pressure prevents severe tire wear and provides longer tire life. However, present inflation pressure of a tire is unknown unless a user physically removes the valve stem cap from the tire and checks the air pressure in the tire with an air pressure gauge. If the air pressure in the tire is lower than the recommended inflation pressure for the particular use of the tire, then compressed air needs to be forced into the tire until the air pressure in the tire is returned to the recommended inflation pressure. If the gauge indicates that the air pressure in the tire exceeds the recommended air pressure, the excess air pressure must be released from the tire until the recommended inflation pressure is established. Inflating the tires, releasing excess air pressure, and re-checking the air pressure in the tire can involve many repeated steps until the recommended air pressure in the ire is reached.

What is needed is a device that can be set at a desired air pressure, wherein a tire can be slightly over-inflated and the excess inflation released by the device in a single operation thereby eliminating the repeated inflating and deflating steps of the prior art.

SUMMARY OF THE INVENTION

The improvements of the device for removing excess air pressure from a vehicle tire of the preset invention include a body having a cavity; an intake port; a control mechanism enabling a user to select a desired magnitude of air pressure above atmospheric pressure; a pressure-measuring mechanism for determining the magnitude above atmospheric pressure of compressed air pressure in the cavity; a display mechanism for display the magnitude of a selected air pressure above atmospheric pressure; a release mechanism having a release valve and an exhaust port having an opened configuration wherein the compressed air is allowed to freely escape from the cavity through the exhaust port, and a closed configuration wherein the release valve prevents compressed air from the cavity from escaping through the exhaust port; and a power source. The control mechanism causes the release mechanism to remain in the closed configuration when the magnitude of air pressure above atmospheric pressure in the cavity is less than the selected magnitude of air pressure above atmospheric pressure, and the control mechanism causes the release mechanism to assume the opened configuration when the magnitude of air pressure above atmospheric pressure in the cavity is greater than the selected magnitude of air pressure above atmospheric pressure.

PRINCIPAL OBJECTS AND ADVANTAGES OF THE INVENTION

The principal objects and advantages of the present invention include: providing a device for a vehicle tire; providing such a device that can be selectively set at a desired air pressure; providing such a device wherein a tire can be slightly over-inflated and the excess inflation released from the tire by the device in a single operation thereby eliminating the repeated inflating and deflating steps of the prior art; and generally providing such a container that is reliable in performance, capable of long lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

DETAILED DESCRIPTION OF THE INVENTION

Figures 1, 2, 3:
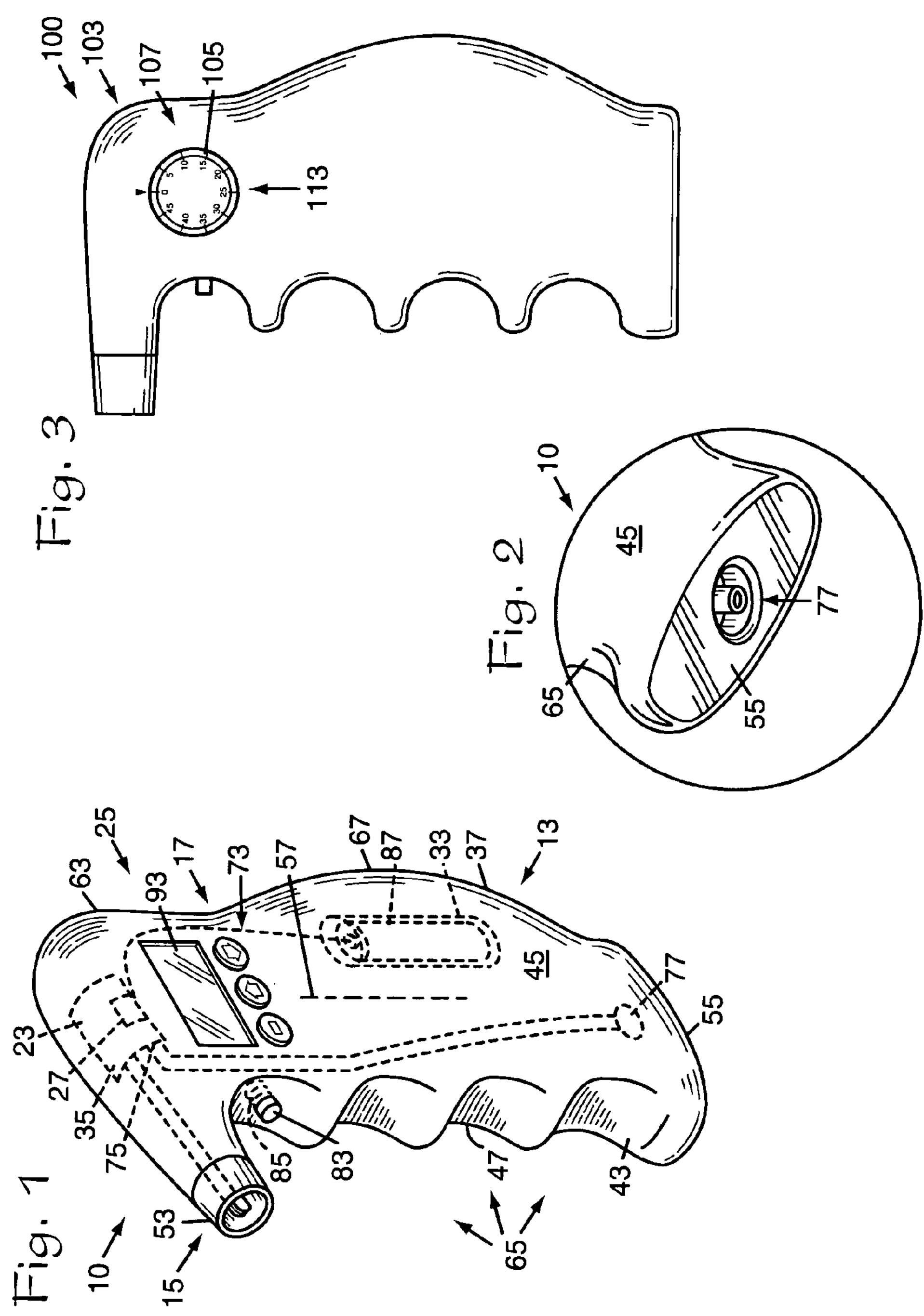
FIG. 1 is a perspective view of a device for removing excess air pressure from a vehicle tire, in accordance with an embodiment of the present invention.
FIG. 2 is an enlarged perspective view of an exhaust port of the device for removing excess air pressure from a vehicle tire.
FIG. 3 is a side elevational view of a modified embodiment of the device for removing excess air pressure from a vehicle tire, in accordance with the present invention.

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a device for removing excess air pressure from a tire of a vehicle in accordance with the present invention, as shown in FIGS. 1 and 2. The device 10 generally includes a body 13, an intake port 15, a control mechanism 17, a pressure-measuring mechanism 23, a display mechanism 25, a release mechanism 27, and a power source 33.

The body 13 includes a cavity 35, a first edge 37, a second edge 43, a first side 45, a second side 47, an input end 53, an exhaust end 55, and a centerline 57 extending from the input end 53 to the exhaust end 55. The body 13 may have a thumb rest 63 on the first edge 37 of the body 13 adjacent to the input 53 end of the body 13, and one or more finger rests 65 spaced along the second edge 43 of the body 13. The body 13 may also have an arcuate protrusion 67 along and extending outwardly from the first edge 37 of the body 13, the protrusion 67 being configured to abut the curvature of a user's palm.

The intake port 15 extends outwardly from the second edge 43 of the body 13 and transversely to the centerline 57 of the body 13. The intake port 15 is structured and configured to be in fluid communication with the cavity 35, to form a fluid-tight seal with a valve stem (not shown) of a tire of a vehicle, to extract compressed air from the valve stem, and to convey the extracted compressed air from the valve stem to the cavity 35.

The control mechanism 17 is structured and configured to enable a user to select a desired magnitude of air pressure above atmospheric pressure. The control mechanism 17 includes a plurality of control buttons 73 configured to increase the magnitude of air pressure above atmospheric pressure to be selected, decrease the magnitude of air pressure above atmospheric pressure to be selected, and accept a desired magnitude of air pressure above atmospheric pressure as the selected magnitude of air pressure above atmospheric pressure.

The pressure-measuring mechanism 23 is connected in communication with the control mechanism 17. The pressure-measuring mechanism 23 is structured and configured to detect the magnitude of the compressed air pressure above atmospheric pressure in the cavity 35.

The display mechanism 25 is connected in communication with the control mechanism 17. The display mechanism 25 is structured and configured to display the magnitude of air pressure above atmospheric pressure selected by use of the control mechanism 17. The display mechanism 25 generally includes at least one screen 93 that is structured and configured to digitally display the magnitude of desired air pressure above atmospheric pressure selected by use of the control mechanism 17. The at least one screen 93 of the display mechanism 25 may be located on the first side 45 of the body 13 to accommodate use of the present invention by a right-handed user, or be located on the second side 47 of the body 13 to accommodate use of the present invention by a left-handed user. Further, the at least one screen 93 may include two screens, one of the two screens located on the first side 45 of the body 13 and the other one of the two screens located on the second side 47 of the body 13 to accommodate use of the present invention by both left-handed and right-handed users.

The release mechanism 27 includes a release valve 75 controlled by the control mechanism 17 and an exhaust port 77. The exhaust port 77 is connected through the release valve 75 to be in fluid communication with the cavity 35. The release mechanism 27 has an opened configuration wherein the release valve 75 allows compressed air from the cavity 35 to freely escape through the exhaust port 77, and a closed configuration wherein the release valve 75 prevents compressed air from the cavity 35 from escaping through the exhaust port 77.

Preferably, the exhaust port 77 is located in the exhaust end 55 of the body 13 so compressed air exhausted therethrough in directed downwardly and away from the hands and head of the user.

For some applications of the present invention, the release mechanism 27 may be in communication with, and be automatically controlled by, the control mechanism 17. The control mechanism 17 causes the release mechanism 27 to remain in the closed configuration when the magnitude of air pressure above atmospheric pressure in the cavity 35 is less than the selected magnitude of air pressure above atmospheric pressure, and wherein the control mechanism 17 causes the release mechanism 27 to assume the opened configuration when the magnitude of air pressure above atmospheric pressure in the cavity 35 is greater than the selected magnitude of air pressure above atmospheric pressure.

For other applications of the present invention, the release mechanism 27 may include an exhaust button 83 that can be pressed to selectively open the release valve 75 so compressed air can freely flow from the cavity 35 to and through the exhaust port 77. The exhaust button 83 includes a resilient device 85, such as a small compression spring 85 for example, that biases the exhaust button 83 outwardly to thereby cause the release valve 75 to be returned to the closed configuration when the exhaust button 83 is released. Preferably, the exhaust button 83 is located where a user's forefinger normally bears against the body 13.

The power source 33 is structured and configured to provide electrical energy to the various components of the device 10 as needed. Typically, the power source 33 includes a battery compartment with a battery 87 contained in the body 13.

The reference numeral 100 generally refers to a modified embodiment of the device for removing excess air pressure from a tire of a vehicle, as shown in FIG. 3. Many of the details of device 100 are substantially similar to those hereinbefore described for device 10, the discussion of which details will not be reiterated herein for modified embodiment 100.

The modified embodiment 100 includes a control mechanism 103 having a rotatable knob 105 that is structured and configured to enable a user to select a desired magnitude of air pressure above atmospheric pressure. A display mechanism 107 includes indicia 113 on the rotatable knob 105 for displaying the magnitude of air pressure above atmospheric pressure selected by use of the control mechanism 103.

As with device 10, the release mechanism 27 of the modified embodiment 100 includes a release valve 75 controlled by the control mechanism 17 and an exhaust port 77. The exhaust port 77 is connected through the release valve 75 to be in fluid communication with the cavity 35. The release mechanism 27 has an opened configuration wherein the release valve 75 allows compressed air from the cavity 35 to freely escape through the exhaust port 77, and a closed configuration wherein the release valve 75 prevents compressed air from the cavity 35 from escaping through the exhaust port 77.

The release mechanism 27 of the modified embodiment 100 includes an exhaust button 83 that can be pressed to selectively open the release valve 75 so compressed air can freely flow from the cavity 35 to and through the exhaust port 77. The exhaust button 83 includes a resilient device 85, such as a small compression spring 85 for example, that biases the exhaust button 83 outwardly to thereby cause the release valve 75 to be returned to the closed configuration when the exhaust button 83 is released. Preferably, the exhaust button 83 is located where a user's forefinger normally bears against the body 13.

In an application of the present invention, a valve stem cap (not shown) is removed from a valve stem of a tire of a vehicle. Compressed air is then forced through the valve stem into the tire until the magnitude of the compressed air pressure above atmospheric pressure in the tire slightly exceeds the air pressure recommended for that tire for the intended use thereof. Then, the intake port 15 is forced against the valve stem of the tire of the vehicle to release compressed air therethrough until the air pressure of the air in the cavity 35 equalizes with the air pressure in the tire of the vehicle. The thumb rest 63, which is substantially co-linear with the direction that the intake port 15 is being forced against the valve stem, may be used to force and hold the intake port 15 against the vale stem while the device of the present invention is being used for its intended purpose.

For applications of embodiment 10 utilizing a release mechanism 27 controlled by the control mechanism 17, if the air pressure in the cavity 35 exceeds the desired air pressure selected by use of the control mechanism 17, the release mechanism 27 automatically releases compressed air from the cavity 35 and tire through the exhaust port 77 until the compressed air pressure in the cavity 35 and the tire is equal to the air pressure selected by use of the control mechanism 17, whereupon the release valve 75 of the release mechanism 27 automatically closes. The intake port 15 is then removed from the valve stem of the tire of the vehicle and the valve stem cap is then reinstalled on the valve stem.

For applications of embodiment 100, if the air pressure in the cavity 35 exceeds the desired air pressure selected by use of the control mechanism 17, pressing the exhaust button 83 of the release mechanism 27 causes compressed air from the cavity 35 and tire to flow through the exhaust port 77 until the compressed air pressure in the cavity 35 and the tire is equal to the air pressure selected by use of the control mechanism 17, whereupon the release valve 75 of the release mechanism 27 automatically closes. The intake port 15 is then removed from the valve stem of the tire of the vehicle and the valve stem cap is then reinstalled on the valve stem.

It is to be understood that while certain forms of the present invention have been illustrated and described herein, it is not to be limited to the specific forms or arrangement of parts as described and shown.

What is claimed and desired to be covered by Letters Patent:

1. A device for removing excess air pressure from a valve stem of a tire of a vehicle, the apparatus comprising:

(a) a body having a cavity, a first side, a second side, a first edge, a second edge, an input end, an exhaust end, and a centerline extending from the input end to the exhaust end;

(b) an intake port located near the input end of the body, the intake port being structured and configured to be in fluid communication with the cavity, to form a fluid-tight seal with the valve stem of the tire, to extract compressed air from the valve stem, and to convey the extracted compressed air from the valve stem to the cavity;

(c) a control mechanism structured and configured to enable a user to select a desired magnitude of air pressure above atmospheric pressure;

(d) a pressure-measuring mechanism connected in communication with the control mechanism, the pressure-measuring mechanism being structured and configured to determine the magnitude above atmospheric pressure of compressed air in the cavity;

(e) a display mechanism connected in communication with the control mechanism, the display mechanism being structured and configured to display the magnitude of air pressure above atmospheric pressure selected by use of the control mechanism;

(f) a release mechanism having a release valve controlled by the control mechanism and having an exhaust port, wherein the exhaust port is connected through the release valve in fluid communication with the cavity, the release mechanism having an opened configuration wherein the release valve allows compressed air from the cavity to freely escape through the exhaust port, and a closed configuration wherein the release valve prevents compressed air from the cavity from escaping through the exhaust port; and (g) wherein the control mechanism causes the release mechanism to remain in the closed configuration when the magnitude of air pressure above atmospheric pressure in the cavity is less than the selected magnitude of air pressure above atmospheric pressure, and wherein the control mechanism causes the release mechanism to assume the opened configuration when the magnitude of air pressure above atmospheric pressure in the cavity is greater than the selected magnitude of air pressure above atmospheric pressure.

2. The device as described in claim 1, wherein the body is shaped to be enclosed in the palm of a user's hand.

3. The device as described in claim 1, wherein the body has a thumb rest on the first edge of the body adjacent to the input end of the body.

4. The device as described in claim 1, wherein the body has one or more finger rests spaced along the second edge of the body.

5. The device as described in claim 1, wherein the body has an arcuate protrusion on the first edge thereof, the protrusion being configured to abut the curvature of a user's palm.

6. The device as described in claim 1, wherein the intake port extends outwardly from the second edge of the body and transversely to the centerline of the body.

7. The device as described in claim 1, wherein the exhaust port is located in the exhaust end of the body.

8. The device as described in claim 1, wherein the control mechanism includes a rotatable knob to enable a user to select the desired magnitude of air pressure above atmospheric pressure.

9. The device as described in claim 8, wherein the display mechanism includes indicia on the rotatable knob for displaying the magnitude of air pressure above atmospheric pressure selected by use of the control mechanism.

10. The device as described in claim 1, further comprising a power source structured and configured to provide electrical energy to the various components of the device as needed.

11. The device as described in claim 1, wherein the device further comprises a battery compartment and a battery contained in the body.

12. The device as described in claim 10, wherein the display mechanism includes at least one screen structured and configured to digitally display the magnitude of air pressure above atmospheric pressure selected by use of the control mechanism.

13. The device as described in claim 1 wherein the control mechanism and the at least one screen of the display mechanism are located on the left side of the body to accommodate use by a right-handed user.

14. The device as described in claim 1 wherein the control mechanism and the at least one screen of the display mechanism are located on the right side of the body to accommodate use by a left-handed user.

15. The device as described in claim 1 wherein the at least one screen includes two screens, one of the two screens located on the right side of the body and the other one of the two screens located on the left side of the body to accommodate use by both left-handed and right-handed users.

16. A device for removing excess air pressure from a valve stem of a tire of a vehicle, the device comprising:

(a) a body having a cavity, a first edge, a second edge, an input end, an exhaust end, and a centerline extending from the input end to the exhaust end, the body being shaped to be enclosed in the palm of a user's hand and having a thumb rest on the first edge adjacent to the input end and having one or more finger rests spaced along the second edge of the body and an arcuate protrusion on the first edge configured to abut the curvature of a user's palm;

(b) an intake port located near the input end of the body, the intake port extending outwardly from the second edge of the body and transversely to the centerline of the body, the intake port being structured and configured to be in fluid communication with the cavity, to form a fluid-tight seal with the valve stem of the tire, to extract compressed air from the valve stem, and to convey the extracted compressed air from the valve stem to the cavity;

(c) a control mechanism structured and configured to enable a user to select a desired magnitude of air pressure above atmospheric pressure;

(d) a pressure-measuring mechanism connected in communication with the control mechanism, the pressure-measuring mechanism being structured and configured to determine the magnitude above atmospheric pressure of compressed air in the cavity;

(e) a display mechanism connected in communication with the control mechanism, the display mechanism having at least one screen structured and configured to digitally display the magnitude of air pressure above atmospheric pressure selected by use of the control mechanism;

(f) a release mechanism having a release valve controlled by the control mechanism and having an exhaust port in the exhaust end of the body wherein the exhaust port is connected through the release valve in fluid communication with the cavity, the release mechanism having an opened configuration wherein the release valve allows compressed air from the cavity to freely escape through the exhaust port, and a closed configuration wherein the release valve prevents compressed air from the cavity from escaping through the exhaust port; and (g) a power source structured and configured to provide electrical energy to the various components of the device as needed; and (h) wherein the control mechanism causes the release mechanism to remain in the closed configuration when the magnitude of air pressure above atmospheric pressure in the cavity is less than the selected magnitude of air pressure above atmospheric pressure, and wherein the control mechanism causes the release mechanism to assume the opened configuration when the magnitude of air pressure above atmospheric pressure in the cavity is greater than the selected magnitude of air pressure above atmospheric pressure.

* * * * *